(12) United States Patent
Campbell et al.

(10) Patent No.: US 11,381,083 B2
(45) Date of Patent: Jul. 5, 2022

(54) INTEGRATING BLOCKCHAIN MINING WITH BOILER CONTROLS TO CREATE A HYBRID POWER GENERATOR

(71) Applicant: Q Power LLC, Pittsburgh, PA (US)

(72) Inventors: Jeffrey Campbell, Butler, PA (US); William Spence, Pittsburgh, PA (US)

(73) Assignee: Q Power LLC, Pittsburgh, PA (US)

( * ) Notice: Subject to any disclaimer, the term of this patent is extended or adjusted under 35 U.S.C. 154(b) by 0 days.

(21) Appl. No.: 17/247,222

(22) Filed: Dec. 4, 2020

(65) Prior Publication Data

US 2021/0175710 A1 Jun. 10, 2021

Related U.S. Application Data

(60) Provisional application No. 62/944,378, filed on Dec. 6, 2019.

(51) Int. Cl.
*H02J 3/14* (2006.01)
*H02J 3/00* (2006.01)

(52) U.S. Cl.
CPC .............. *H02J 3/144* (2020.01); *H02J 3/003* (2020.01); *H02J 3/004* (2020.01); *H04L 2209/38* (2013.01)

(58) Field of Classification Search
CPC ............. H02J 3/144; H02J 3/003; H02J 3/004
USPC ....................................... 700/286
See application file for complete search history.

(56) References Cited

U.S. PATENT DOCUMENTS

| | | | |
|---|---|---|---|
| 2014/0190144 A1* | 7/2014 | Ozawa | H01M 8/0435 60/39.12 |
| 2017/0273221 A1* | 9/2017 | Bonar | H05K 7/20827 |
| 2020/0051184 A1* | 2/2020 | Barbour | H04L 67/104 |

\* cited by examiner

*Primary Examiner* — Jigneshkumar C Patel
(74) *Attorney, Agent, or Firm* — Fay Sharpe LLP

(57) ABSTRACT

Disclosed are systems and methods of generating electrical power utilizing a mining bank of individual blockchain miners. The blockchain miners operate as a revenue generating heat source that provides thermal energy into a power plant's Rankine or Brayton cycle turbines.

17 Claims, 3 Drawing Sheets

INTEGRATING BLOCKCHAIN MINING WITH BOILER CONTROLS TO CREATE A HYBRID POWER GENERATOR

CLAIM OF PRIORITY

This application claims priority from U.S. Provisional Patent Application Ser. No. 62/944,378 filed on Dec. 6, 2019, the entirety of which is hereby incorporated by reference.

BACKGROUND

Current fossil and nuclear power plants rely on either Rankine or Brayton cycle turbines to raise or lower power output. These steam or gas turbines change electrical output by changing the heat input to their combustion zones. There is a fundamental lag between the time additional electrical power generation is requested and the time the power is delivered. This lag is due to the time required to ignite the fuel and transfer the heat of combustion to the working fluid (steam/air) used in the thermal cycle. Additional ramp limits are required to allow metals in the combustion section to expand/contract to the new temperature. Power plants use a generation request signal from the grid operator as the input to their fuel control systems. As that generation request is moved, the control systems move heat input to match the request (while recognizing the lags outlined above).

When load changes faster than power generation can follow, grid operators must dispatch less efficient fast start units or use one shot battery solutions to meet high demand. Presently, utility-scale batteries are used to supply power to satisfy steep load ramp rates while conventional fossil units ramp for consumer demand, but these batteries have finite capacity and must be recharged between uses—leaving an exposure in the grid if conventional fossil generation has not ramped to meet consumer load.

Blockchain mining requires heavy computational processing (e.g., by specialized computers) which consumes electrical power and produces heat. Generally, "mining" is a process of adding transaction records to a public ledger of past transactions called the blockchain, which exists so every transaction can be confirmed. For example, the mechanics of blockchain-based currencies require a brute force computation to find a single unique number from over 1 quintillion ($10^{18}$) number combinations. The processing required to find that unique combination is referred to as "mining". Significant electrical power is required to process all the combinations to find that one unique number, this power consumption is what gives that one number value and makes it unlikely or unreasonable for one to expend identical power resources in order to counterfeit it.

Current blockchain mining technology uses purpose-built high-power computing modules to perform the search. These machines run at 100% processing power 24 hours a day at dedicated mining operations. The power required for mining is almost entirely a function of resistive losses as the transistors used switch states while searching for the desired number. The Application Specific Integrated Chip (ASIC) processors change states billions of times a second while searching and will by definition require immense power—because expending power represents a finite resource being used to perform a task, the more resources expended the more difficult the task is to duplicate. These mining centers exist on the grid as purely resistive consumer loads and are indistinguishable from conventional load banks from a power standpoint.

The new art introduced in this disclosure is the integration of mining power with a conventional power plant control system to allow that plant to respond to changes in demand like a battery without the limited capacity of batteries. In addition to fast response, the mining process results in large quantities of hot air which can be recovered by locating the miners in a position where hot air can be fed into the air intake of Rankine cycle units. This pre-heated air increases forced draft fan efficiency, reduces the heat input required for steaming, and offsets the parasitic losses of existing resistive or steam coil air heaters.

Unlike a resistive load bank where heat is the only product, blockchain miners generate a revenue stream through processing of data with a resulting byproduct of heat. This means that the fuel cost for mining is paid by the processing of information and the heat generated allows 100% recovery of the fuel cost back to the plant.

The exemplary systems and methods described below offer a novel solution to the existing problem that consumer load changes faster than generators can ramp their output. It also addresses the potential wasteful use of resources for blockchain number searching by using blockchain mining to manage load.

BRIEF DESCRIPTION

Various details of the present disclosure are hereinafter summarized to provide a basic understanding. This summary is not an extensive overview of the disclosure and is neither intended to identify certain elements of the disclosure, nor to delineate scope thereof. Rather, the primary purpose of this summary is to present some concepts of the disclosure in a simplified form prior to the more detailed description that is presented hereinafter.

In accordance with some aspects of the present disclosure, a power system includes a combustor configured to produce steam. The power system also includes a power generation system that is configured to convert thermal energy to electrical energy. A blockchain mining bank composed of a plurality of individual mining units is provided in the system to provide heat energy produced from performing a blockchain process to the combustor. The blockchain mining bank is controlled by a blockchain mining controller configured to cycle each mining unit of the mining bank from a standby state to an operational state and vice-versa.

The power system may be configured to export power and provide electrical power to the blockchain mining bank.

In some embodiments, the power generation system comprises a turbine.

The power system may further include a master controller configured to control an amount of fuel provided to the combustor.

In some embodiments, the master controller includes a processor, a network interface in communication with the processor, and a memory in communication with the processor.

The master controller may be configured to compare power consumption of the blockchain mining bank to a threshold value and release heat input to the combustor when below the threshold value.

In some embodiments, the combustor comprises a heat source, such as a fire box or a furnace.

The mining bank controller may include a distributed control system or a programmable logic controller.

In some embodiments, the mining bank controller includes a processor, a network interface in communication with the processor, and a memory in communication with the processor.

Optionally, the processor and memory are combined in a single chip.

The power system may further include a fan between the blockchain mining bank and the combustor.

In accordance with another aspect of the disclosure, a power generation system includes: a combustor; and a blockchain mining bank in fluid communication with the combustor.

The blockchain mining bank may include an inlet for receiving lower temperature gas and an outlet for providing higher temperature, preheated gas to the combustor.

The combustor may include: a combustion furnace for generating hot combustion gas; and a steam generator for converting water to steam using heat from the hot combustion gas.

In some embodiments, the power generating system further includes: a turbine for converting energy from the steam into mechanical energy; and an electrical generator connected to the turbine for converting the mechanical energy into electrical energy.

In accordance with another aspect of the present disclosure, a method for generating power is described. The method includes, with a mining bank controller operatively connected to a mining bank of individual blockchain miners, receiving an output request to increase power output of a power plant to an electrical grid. The output request is compared with a present net electrical output of the power plant and individual blockchain miners of a mining bank are cycled to standby, wherein cycling miners to standby reduces a power consumption of the mining back and wherein the reduction in power consumption is an increase in electrical output to the electrical grid.

These and other non-limiting characteristics of the disclosure are more particularly disclosed below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
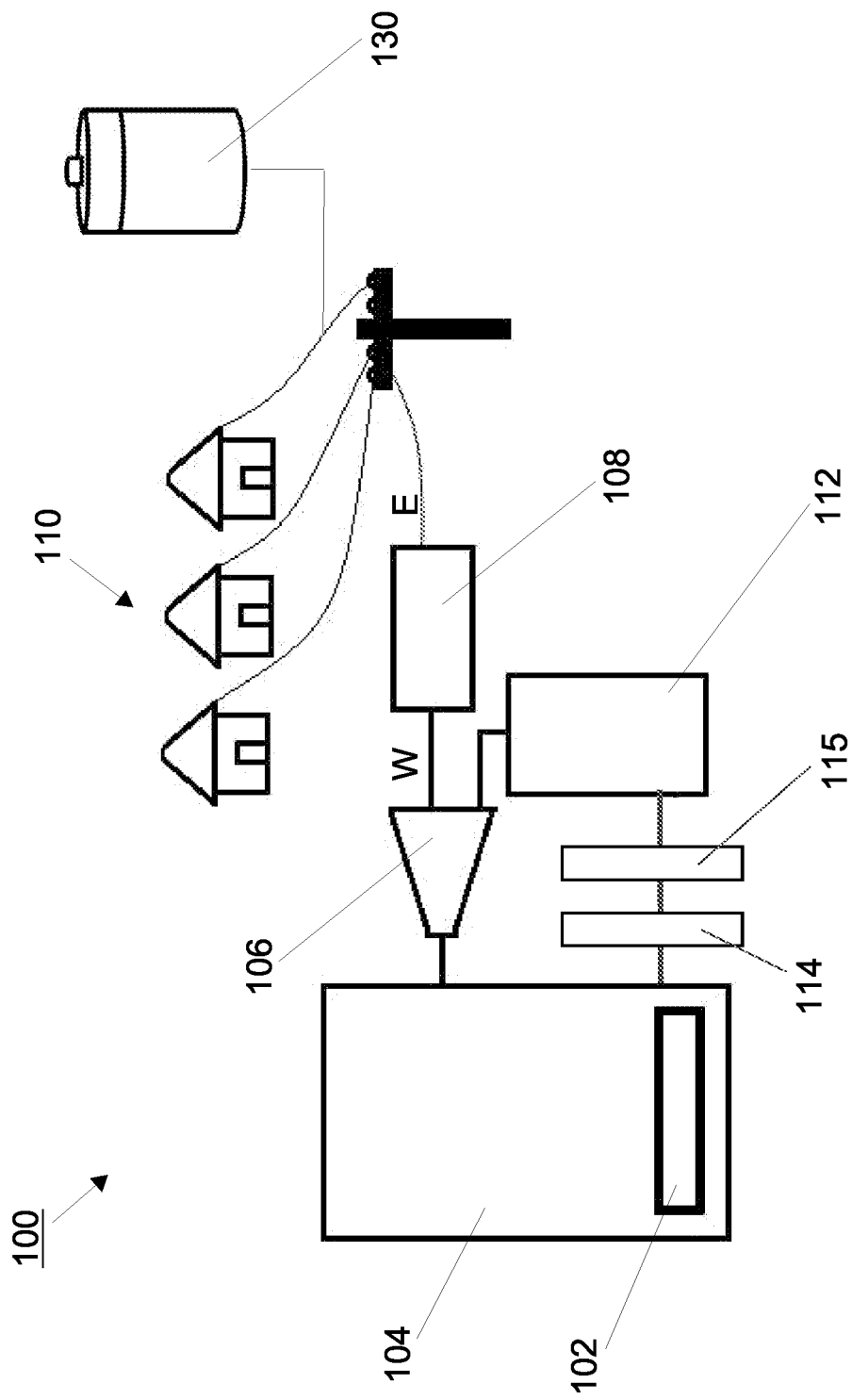
FIG. 1 is a schematic of a Rankine power generation system.

A more complete understanding of the components, processes and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings and are not intended to define or limit the scope of the disclosure. In the drawings and the following description below, it is to be understood that like numeric designations refer to components of like function.

The singular forms "a," "an," and "the" include plural referents unless the context clearly dictates otherwise.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

The terms "about" and "approximately" can be used to include any numerical value that can vary without changing the basic function of that value. When used with a range, "about" and "approximately" also disclose the range defined by the absolute values of the two endpoints, e.g. "about 2 to about 4" also discloses the range "from 2 to 4." Generally, the terms "about" and "approximately" may refer to plus or minus 10% of the indicated number.

"Measuring" power output/consumption is to be understood as measuring electrical current (amperage) or power (wattage) and the like by means and devices known in the art.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/components/steps and permit the presence of other ingredients/components/steps. However, such description should be construed as also describing compositions, articles, or processes as "consisting of" and "consisting essentially of" the enumerated ingredients/components/steps, which allows the presence of only the named ingredients/components/steps, along with any impurities that might result therefrom, and excludes other ingredients/components/steps.

FIG. 1 is a block diagram illustrating a Rankine cycle system generally associated with a power plant such as a coal-fired power plant or nuclear reactors. A power plant Rankine system 100 generally includes a heat source 102 used to produce heat within a boiler 104. The heat changes the phase of an operating material that is input from pump 114 from a liquid to gas, e.g., water to steam. The high temperature gas passes through a turbine 106 producing useful work W. An electric generator 108, converts the mechanical work W obtained from the turbine 106 into electrical energy E. This electrical energy is applied to an electrical gird 110, powering homes and the like. The operating material is condensed within a condenser 112 where it cools and is able to be pumped again into the boiler 104. When electrical power is demanded, i.e., the gird 110 requires more power, the temperature in the heat source 102 for producing the heated gas must be increased (typically by burning fuel in the "boiler"). That is, the hotter the gas, i.e., the more energy it has, the more work W is performed. Oftentimes, there is a lag between the electrical demand and when an increase in power to meet that demand is provided.

Some power systems 100 include an air preheater 115. The function of the preheaters is to raise the ambient air temperatures before it enters the boiler 104 and increase the thermal efficiency of the boiler. Preheaters 115 are variously embodied as regenerative, resistive or steam coil air heaters. The preheater 115 may be located before or after the pump 114.

Some power systems have utility-scale batteries 130 configured to distribute electrical power to the grid 110 during periods of increased demand. That is, the batteries 130 are used to supply power to satisfy steep load ramp rates while conventional fossil units ramp for consumer demand, but these batteries 130 have finite capacity and must be recharged between uses—leaving an exposure in the power grid 110 if conventional fossil generation has not ramped to meet consumer load.

Figure 2:
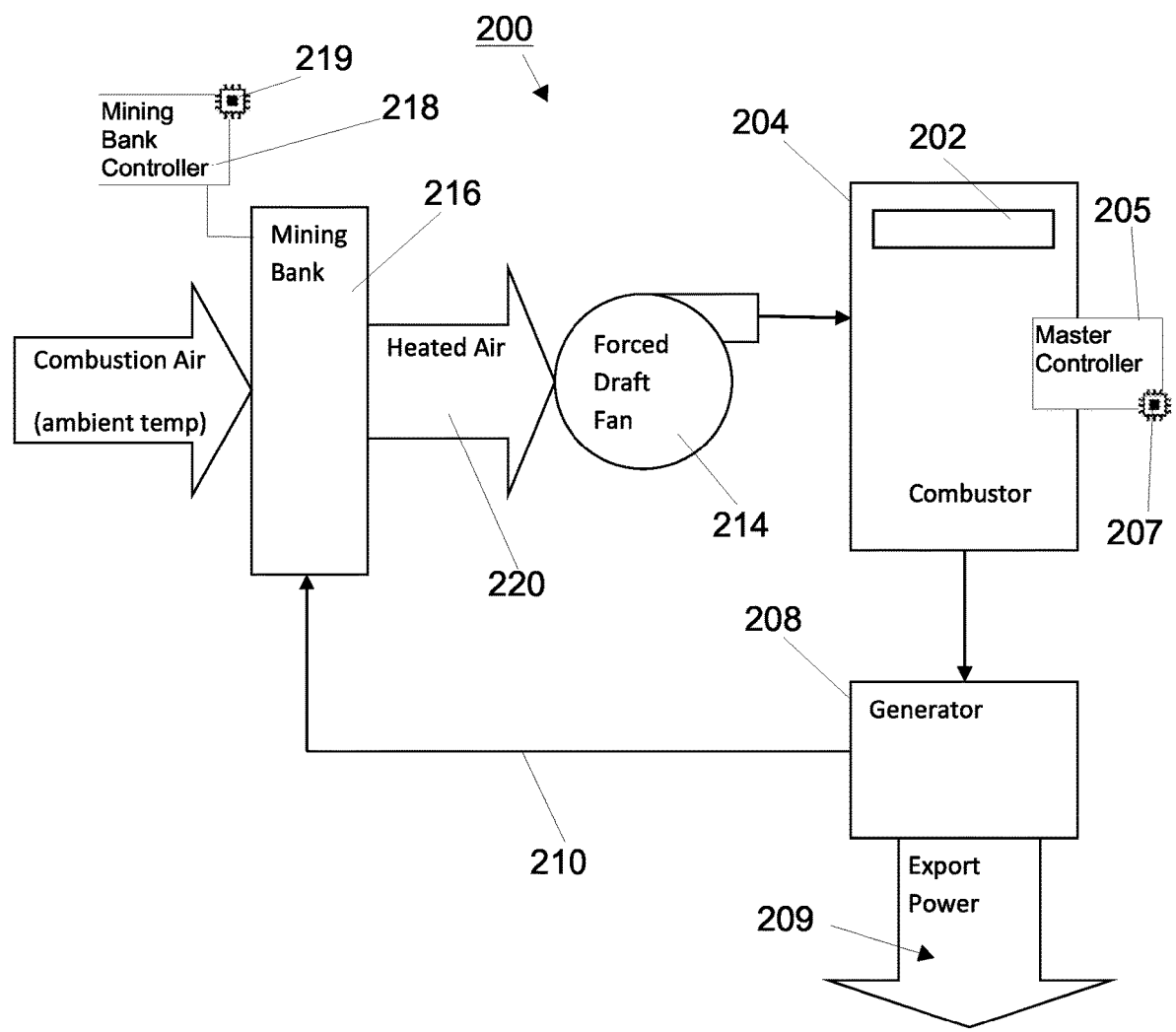
FIG. 2 is a block diagram of a power system utilizing a mining bank in accordance with the present disclosure.

With reference to the exemplary embodiment of FIG. 2, provided is a power system 200 that reduces the lag time between an electrical demand and power increase. As described above, blockchain mining requires heavy processing which both consumes power and produces heat. This heat (hot air) can be harnessed and injected into a Rankine cycle system of a power plant, such as Rankine system 100, saving time and fuel costs. While Rankine systems are described and illustrate, it is to be appreciated that the present disclosure is also amenable to other thermal systems, such as Brayton systems. In addition to fast response, the mining process results in large quantities of hot air which can be recovered. The power system 200 a mining bank 216, a pump 214, a combustor 204, and a power generation system 208.

The mining bank 216 includes at least one hardware system that performs the necessary computations for "mining," i.e., adding transaction records to the public ledger of past transactions. That is, the mining bank 216 is composed of a plurality of individual miner units. Transaction data is permanently recorded in files called "blocks." These "blocks" are analogous to individual pages of a record book or stock transaction ledger. Blocks are organized into a linear sequence over time (known as a blockchain). Each block contains, among other things, the current time, a record of some or all recent transactions, and a reference to the block that came immediately before it. It also contains an answer to a difficult-to-solve mathematical puzzle—the answer to which is unique to each block. New blocks cannot be submitted to the network without the correct answer—the process of "mining" is essentially the process of competing to be the next to find the answer that "solves" the current block. The mathematical problem in each block is extremely difficult to solve, but once a valid solution is found, it is very easy for the rest of the network to confirm that the solution is correct. There are multiple valid solutions for any given block—only one of the solutions needs to be found for the block to be solved.

For some currency based blockchain, e.g., bitcoin, there is a reward of new bitcoins for solving each block, every block also contains a record of which Bitcoin addresses or scripts are entitled to receive the reward. This record is known as a generation transaction, or a Coinbase transaction, and is always the first transaction appearing in every block. The number of Bitcoins generated per block starts at 50 and is halved every 210,000 blocks (about four years).

Blockchain transactions are broadcast to a network by a sender, and all peers trying to solve blocks collect the transaction records and add them to the block they are working to solve. Miners get incentive to include transactions in their blocks because of attached transaction fees.

The difficulty of the attached mathematical problem is automatically adjusted by the network, such that it targets a goal of solving an average of 6 blocks per hour. Every 2016 blocks (solved in about two weeks), all Bitcoin clients compare the actual number created with this goal and modify the target by the percentage that it varied. The network comes to a consensus and automatically increases (or decreases) the difficulty of generating blocks.

Various hardware systems a be used to mine blocks, including but not limited to Computer processing units (CPU's), graphical processing units (GPUs), Field Programmable Gate Arrays (FPGA), Application Specific Integrated Circuit chips. The mining bank 216 includes at least one hardware system, preferably, a plurality of systems, to compute blockchain mining algorithms.

The operation of the mining bank 216 is controlled by a mining bank controller 218 which may be in the form of a Distributed Control System (DCS) or Programmable Logic Controller (PLC) either utilizing existing power plant spare control inputs or added to the existing system. The DCS either sends a signal to energize/de-energize contactors powering the mining banks, or it sends a signal to a separate CPU that uses software commands to instruct the miner banks to go to idle power status. The mining bank controller 218 is configured to receive via a network interface, requests, e.g., from a grid operator, and change the power consumption of the mining bank 216 by turning On or off, (placing individual miners on standby) hardware components of the mining bank 216. That is, the mining bank controller 218 may include a computer system that includes a processor 219, a network interface in communication with the processor, and memory in communication with the processor. The memory stores instructions which are executed by the processor 219 to selectively power components of the mining bank 218. In some embodiments, the processor 219 and memory may be combined in a single chip. The network interface allows the mining bank controller 218 to communicate with other devices via a computer network and may comprise a modulator/demodulator (MODEM). The processor 219 of the mining bank controller 218 can be variously embodied, such as by a single core processor, a dual core processor (or more generally by a multiple core processor), a digital processor and cooperating math coprocessor, a digital controller, or the like. The digital processor 219, in addition to controlling the operation of the mining bank 216, may also execute instructions stored in a memory for performing the methods set forth hereinafter.

The processing/mining operation generates large quantities of heat. That is, the mining bank hardware 216 heats up while it performs mining processes. Hardware systems e.g., individual miner units of the mining bank 216, for mining generally work based on the movement of electronic impulses. When the hardware gets warmer, the heat cases those impulses to travel more slowly, which can result in impulses not arriving when they are supposed to, causing the system to compute incorrectly eventually leading the hardware to crash or physically melt the solder connections between components. It is desirable to take the heat away that is provided by the mining bank hardware 216. In some preferred embodiments, a cooling media (either gas or liquid) flows over the mining bank 216 drawing heat from the individual mining units. The hot cooling media is then directed out of the area via exhaust. This hot air 220 is recycled by the system, if liquid is used the cooled liquid is returned to the mining bank for reheat 200. As illustrated in the exemplary embodiment of FIG. 2, the mining bank 216 is located in a position where that rejected heat in the form of hot air (exhaust) 220 can be fed into the air intake of Rankine cycle units, such as the exemplary system 100 of FIG. 1. This pre-heated air increases forced draft fan 214 efficiency, reduces the heat input required for generating steam within the combustor 204, and offsets the parasitic losses of existing resistive or steam coil air heaters, such as the preheater 115 of FIG. 1.

In some embodiments, the combustor 204, is a boiler or steam generator used to create steam by applying heat energy to water. While steam is discussed herein, it is to be appreciated that other gases may be used in the power plant's thermal system as known in the art. The combustor 204 includes a heat source 202 that produces heat. In some embodiments, the heat source 202 is a fire box or furnace that burns fuel in order to produce heat. When a higher temperature is required, e.g., by a power request from a grid operator, more fuel is burned within the heat source 202. The higher the temperature in the combustor 204 the faster the steam/gas production. The stream produced can then be used immediately to produce power via a turbine and alternator, for example by power generation system 208. In some embodiments, the steam/gas may be further superheated to a higher temperature, notably reducing the amount of suspended water content making a given volume of steam produce more work.

The power generation system 208 uses the steam to generate mechanical work which is converted into electrical energy. The power generation system 208 may use a steam turbine that extracts thermal energy from pressurized steam and uses the steam to do mechanical work on a rotating output shaft. The power generation system may also utilize a generator that converts mechanical work into electrical power. The power generation system 208 exports the power (at 209) to the power grid 110.

The power generation system 208 is also configured to power the mining bank 216. That is, the electrical power needed to operate the individual miner units of the mining bank 216, e.g., the mining systems discussed above, is provided by the generator of the power generation system 208.

Unlike a resistive load bank where heat is the only product, the blockchain mining bank 216, generates a revenue stream through processing of data with a resulting byproduct of heat. For example, mining Bitcoin or other blockchain based currencies generates wealth in that currency. This means that the fuel cost for the mining is paid by the processing of information and the heat generated allows about 100% recovery of the fuel cost back to the plant. The power system 200 operates at a given power output, wherein the power output is the sum of the electrical power distributed to the grid 110 and the power distributed to the mining bank 216.

The mining bank controller 218 is configured receive a generation request signal from a grid operator. The generation request is a request to increase the power output to the grid 110. The mining bank controller compares the output request with the present plant net output and cycles individual mining components of the mining bank 216) to standby. Cycling miners to standby reduces the power consumption of the mining bank, allowing the electrical power that would have been supplying that miner to be distributed out to the power grid 110.

A master controller 205 is configured to control the amount of fuel needed to operate the combustor 204 and produce steam. The master controller 205 may include a computer system that includes a processor 207, a network interface in communication with the processor 207, and memory in communication with the processor 207. The memory stores instructions which are executed by the processor 207 to control the addition of fuel into the heat source 202. The master controller 205 is also configured to compare the mining bank power consumption to a threshold value, e.g., an operator defined value. When miners are cycled to standby, and power is diverted to the grid 110, the master controller 205 will measure the output 210 to the mining bank 216 as below the threshold value, since it just cycled units off to satisfy the generation request.

When output 210 to the mining bank 216 is below threshold, the master controller 205 is configured to increase heat input to the combustor 204. The increased heat input provides for more electrical energy to be produced by the power generation system 208. The increased energy supplies both the demand of the grid and allows the mining bank controller 218 to cycle individual miner from standby to operational. In other words, the threshold value of output 210 to the mining bank 216 will be restored.

Simultaneously, with the increased generation of power, the mining bank controller 218 measures an increasing power output above grid operator setpoints. Setpoints that are adjusted though generation requests. Upon measuring power generation above these values instructs the mining controller 218 to cycle individual miners of the mining bank 216 from standby to on, consuming the additional power. The master controller 205, upon measuring the additional mining bank consumption, stops increasing the heat input (burning fuel).

Figure 3:
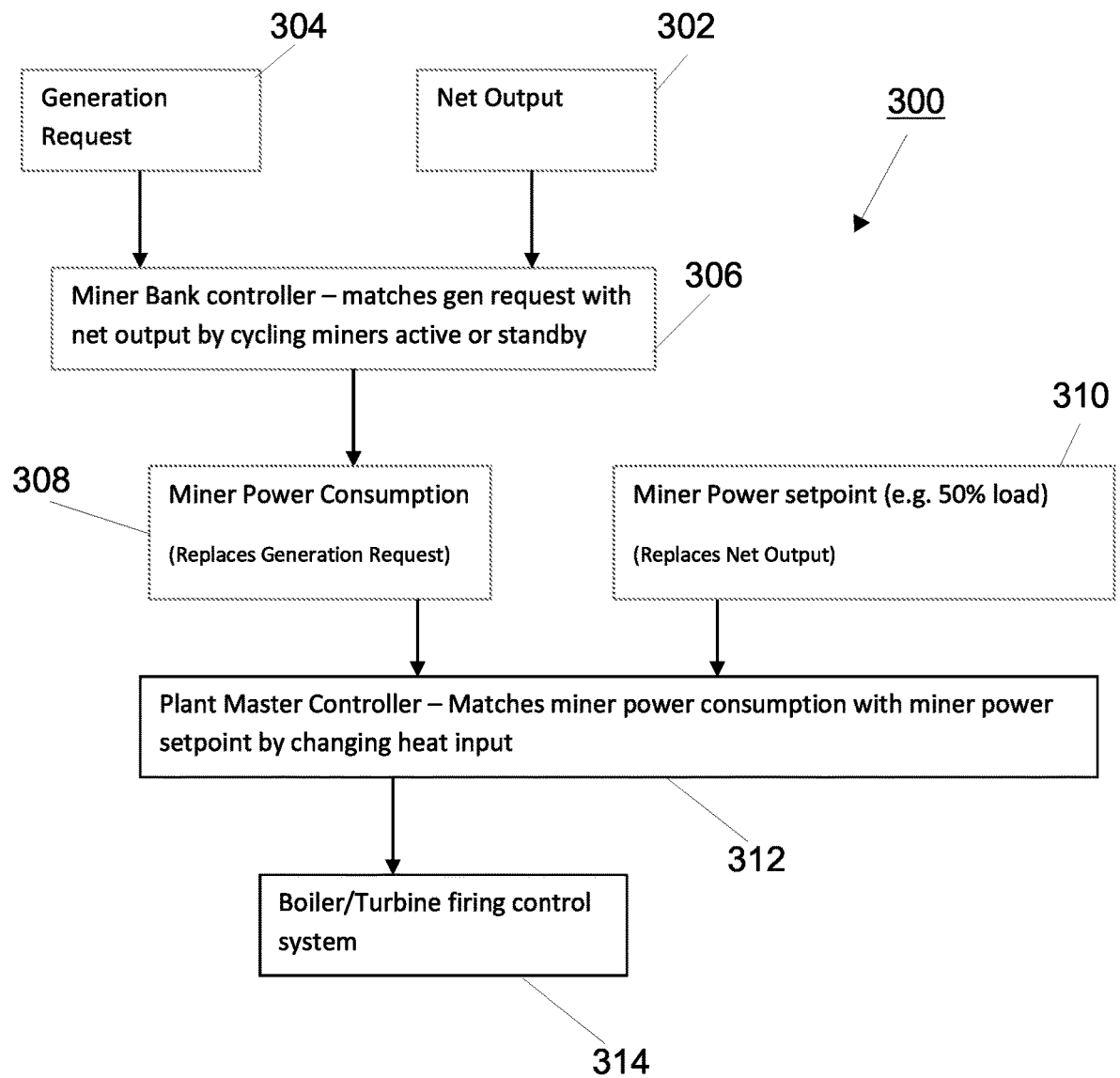
FIG. 3 is a block diagram of a method for generating power utilizing a power generation system with a mining bank in accordance with the present disclosure.

In accordance with another aspect of the present disclosure and with reference to FIG. 3, a method 300 for power generation utilizing blockchain mining is provided. The method 300 utilizes a power system with similar components to those described in relation to FIGS. 1-2. This method 300 replaces the heat input-based control system of typical Rankine systems with a modulating bank of blockchain miners (216 of FIG. 2) sequenced with the existing boiler master controller (205 of FIG. 2).

In a steady-state, the power system 200 produces enough heat to create steam to generate enough electrical power (Net Output 302) to meet the demands of both the power grid 110 and mining bank 216.

The method 300 begins with a generation request 304 from a grid operator/regional transmission organization (RTO)/independent system operator (ISO) e.g., PJM, ISO NE, ERCOT, etc. If the grid operator requests a generation increase 304 the controls (205 and 218) respond as described below (assume properly tuned control loops). The grid operator signal can be received by the plant through various methods of telemetry (Ethernet, SCADA, POTS lines) in the form of a desired mw output to the grid. That output signal can be automatically fed to the boiler fuel controllers to raise or lower output to the desired level. An RTO is an electric power transmission system operator that coordinates, controls, and monitors the operation of the electrical power system. The grid operators forecast load and schedule generation to assure that sufficient generation and back-up power is available in case demand rises or a power plant or power line lost.

In conventional systems, the generation request 304 is received by the master controller 205, wherein additional fuel is burned to meet power demands. In this embodiment a mining bank controller 216 at 306 receives the generation request 304 from the operator and sends outputs to the mining bank. To raise load, the mining bank controller 218 at 308 compares the output request of the generation request 304 with the present plant net output 302 and cycles sufficient miners of the mining bank 216 to standby (reducing miner bank power consumption) to match output with the generation request 304.

At 312, the master controller 205 compares the mining bank power consumption to a user input target mining bank power (eg, 50% load) (instead of the conventional power output request currently used in power generators) 310. It will measure that the mining bank 216 is operating below target since the mining bank controller 218 just cycled individual mining units of the mining bank 216 to standby satisfy the grid operator generation request 304.

The plant master controller 205 sends an output signal (% load) to the boiler controller 314 to increase/decrease heat input. The boiler controller calculates the necessary quantities and locations of air and fuel and manages the boiler flow control devices to achieve proper combustion in the combustor 204 to increase power generation and bring mining bank 216 back to setpoint 310.

The mining bank controller 218 measures the increase in power generation from the previous control step, measures that output is now above the grid operator setpoint, and cycles individual miners of the mining bank 216 back online to consume the additional power and restore the requested setpoint. Simultaneously, the master controller 205 measures additional mining bank consumption and stops increasing heat input of the boiler/turbine firing control system. At this point, the generator is at a steady-state in the new requested level.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art, which are also intended to be encompassed by the following claims.

To aid the Patent Office and any readers of this application and any resulting patent in interpreting the claims appended hereto, applicants do not intend any of the appended claims or claim elements to invoke 35 U.S.C. 112(f) unless the words "means for" or "step for" are explicitly used in the particular claim.

What is claimed is:

1. A power system comprising:
   a combustor configured to produce steam;
   a power generation system configured to convert thermal energy to electrical energy;
   a blockchain mining bank comprising a plurality of individual mining units configured to provide heat energy produced from performing a blockchain process to the combustor;
   a blockchain mining controller configured to cycle each mining unit of the mining bank from a standby state to an operational state and vice-versa; and
   a master controller configured to control an amount of fuel provided to the combustor;
   wherein the master controller is configured to compare power consumption of the blockchain mining bank to a threshold value and release heat input to the combustor when below the threshold value.

2. The power system of claim 1, wherein the power generation system is configured to export power and provide electrical power to the blockchain mining bank.

3. The power system of claim 1, wherein the power generation system comprises a turbine.

4. The power system of claim 1, wherein the master controller comprises a processor, a network interface in communication with the processor, and a memory in communication with the processor.

5. The power system of claim 1, wherein the combustor comprises a heat source.

6. The power system of claim 5, wherein the heat source comprises a fire box or a furnace.

7. The power system of claim 1, wherein the mining bank controller comprises a distributed control system or a programmable logic controller.

8. The power system of claim 1, wherein the mining bank controller comprises a processor, a network interface in communication with the processor, and a memory in communication with the processor.

9. The power system of claim 8, wherein the processor and memory are combined in a single chip.

10. The power system of claim 1, further comprising:
    a fan between the blockchain mining bank and the combustor.

11. A power generation system comprising:
    a combustor;
    a blockchain mining bank in fluid communication with the combustor; and
    a master controller configured to control an amount of fuel provided to the combustor;
    wherein the master controller is configured to compare power consumption of the blockchain mining bank to a threshold value and release heat input to the combustor when below the threshold value.

12. The power generation system of claim 11, wherein the blockchain mining bank comprises an inlet for receiving lower temperature gas and an outlet for providing higher temperature, preheated gas to the combustor.

13. The power generation system of claim 11, wherein the combustor comprises:
    a combustion furnace for generating hot combustion gas; and
    a steam generator for converting water to steam using heat from the hot combustion gas.

14. The power generation system of claim 13, further comprising:
    a turbine for converting energy from the steam into mechanical energy; and
    an electrical generator connected to the turbine for converting the mechanical energy into electrical energy.

15. The power system of claim 11, wherein the blockchain mining bank comprises a plurality of individual mining units configured to provide heat energy produced from performing a blockchain process to the combustor; and wherein the power system further comprises:
    a blockchain mining controller configured to cycle each mining unit of the mining bank from a standby state to an operational state and vice-versa.

16. A method for generating power comprising:
    with a mining bank controller operatively connected to a mining bank of individual blockchain miners,
    receiving an output request to increase power output of a power plant to an electrical grid;
    comparing the output request with a present net electrical output of the power plant; and
    cycling individual blockchain miners of a mining bank to standby, wherein cycling miners to standby reduces a power consumption of the mining back and wherein the reduction in power consumption increases electrical output to the electrical grid; and with a master controller configured to compare power consumption of the mining bank to a threshold value and release heat input to a combustor when below the threshold value:

controlling an amount of fuel provided to the combustor.

17. The method of claim 16, wherein the power plant comprises:

the combustor comprising:
- a furnace in fluid communication with the mining bank for generating hot combustion gas;
- a steam generator for converting water to steam using heat from the hot combustion gas;

a turbine for generating mechanical energy from the steam; and an electrical generator for converting the mechanical energy into electrical energy.

* * * * *

UNITED STATES PATENT AND TRADEMARK OFFICE
CERTIFICATE OF CORRECTION

| | |
|---|---|
| PATENT NO. | : 11,381,083 B2 |
| APPLICATION NO. | : 17/247222 |
| DATED | : July 5, 2022 |
| INVENTOR(S) | : Campbell et al. |

It is certified that error appears in the above-identified patent and that said Letters Patent is hereby corrected as shown below:

On the Title Page

Item (54) and in the Specification, Column 1, Line 1, should read as follows:
INTEGRATING BLOCKCHAIN MINING WITH PLANT CONTROLS TO CREATE A HYBRID POWER GENERATOR Signed and Sealed this
Twentieth Day of September, 2022

Katherine Kelly Vidal
*Director of the United States Patent and Trademark Office*